US008782165B2

(12) United States Patent
Fee et al.

(10) Patent No.: US 8,782,165 B2
(45) Date of Patent: Jul. 15, 2014

(54) METHOD AND TRANSCODING PROXY FOR TRANSCODING A MEDIA STREAM THAT IS DELIVERED TO AN END-USER DEVICE OVER A COMMUNICATIONS NETWORK

(75) Inventors: Paul Fee, Belfast (GB); Stephen Wright, Belfast (GB); Declan Harrison, Belfast (GB)

(73) Assignee: Openwave Mobility, Inc., Redwood City, CA (US)

( * ) Notice: Subject to any disclaimer, the term of this patent is extended or adjusted under 35 U.S.C. 154(b) by 138 days.

(21) Appl. No.: 13/014,017

(22) Filed: Jan. 26, 2011

(65) Prior Publication Data

US 2012/0191805 A1 Jul. 26, 2012

(51) Int. Cl.
*G06F 15/16* (2006.01)
(52) U.S. Cl.
USPC .......................................................... 709/217
(58) Field of Classification Search
USPC .......................................................... 370/401
See application file for complete search history.

(56) References Cited

U.S. PATENT DOCUMENTS

| | | | | |
|---|---|---|---|---|
| 6,563,517 B1* | 5/2003 | Bhagwat et al. | .............. | 715/735 |
| 7,072,393 B2* | 7/2006 | Boice et al. | .............. | 375/240.01 |
| 7,463,686 B2* | 12/2008 | Seo | .......... | 375/240.16 |
| 7,634,794 B1* | 12/2009 | Paik et al. | ........ | 725/62 |
| 7,873,074 B1 | 1/2011 | Boland | | |
| 2001/0008556 A1 | 7/2001 | Bauer et al. | | |
| 2004/0098463 A1 | 5/2004 | Shen et al. | | |
| 2005/0190872 A1* | 9/2005 | Seong et al. | ................. | 375/354 |
| 2006/0013235 A1* | 1/2006 | Farnham | ........................ | 370/401 |
| 2007/0237263 A1* | 10/2007 | Strolle et al. | .................. | 375/321 |
| 2008/0195748 A1 | 8/2008 | Tierney et al. | | |
| 2008/0207182 A1* | 8/2008 | Maharajh et al. | .......... | 455/414.1 |
| 2009/0003436 A1 | 1/2009 | Levin et al. | | |
| 2009/0029687 A1 | 1/2009 | Ramer et al. | | |
| 2009/0083279 A1 | 3/2009 | Hasek | | |
| 2009/0161656 A1 | 6/2009 | Vikberg et al. | | |
| 2010/0030808 A1* | 2/2010 | Ress et al. | .................. | 707/104.1 |
| 2010/0034089 A1 | 2/2010 | Kovvali et al. | | |
| 2010/0034218 A1 | 2/2010 | Kovvali et al. | | |
| 2010/0158026 A1 | 6/2010 | Valmikam et al. | | |
| 2010/0226257 A1 | 9/2010 | Bokish et al. | | |

OTHER PUBLICATIONS

Warabino, Takayuki and et al. "Video Transcoding Proxy for 3G wireless Mobile Internet Access" Oct. 2000, IEEE Communications Magazine, pp. 66-71.*

(Continued)

*Primary Examiner* — Jason K. Gee
*Assistant Examiner* — Maung Lwin (57) ABSTRACT

Methods and transcoding proxies for transcoding media streams are described. In one embodiment, a method for transcoding a media stream that is delivered to an end-user device over a communications network involves selecting a transcoding technique for the media stream, transcoding a portion of the media stream using the selected transcoding technique, streaming the transcoded portion of the media stream to the end-user device, while the transcoded portion of the media stream is being streamed to the end-user device, detecting a change in a condition of the communications network, selecting a different transcoding technique in response to the change in the condition of the communications network, transcoding a subsequent portion of the media stream using the different transcoding technique, and streaming the transcoded subsequent portion of the media stream to the end-user device. Other embodiments are also described.

23 Claims, 6 Drawing Sheets

(56) References Cited

OTHER PUBLICATIONS

Ishfaq Ahmad, Xiaohui Wei, Yu Sun, Ya-Qin Zhang, "Video Transcoding: An Overview of Various Techniques and Research Issues", IEEE Transactions on Multimedia, vol. 7, No. 5, Oct. 2005, p. 793-804.

Songqing Chen, Haining Wang, Bo Shen, Susie Wee, Xiaodong Zhang, "Segment-based Proxy Caching for Internet Streaming Media Delivery", IEEE, vol. 12, Issue 3, 2005, p. 1-9.

Richard Han, Pravin Bhagwat, Richard Lamaire, Todd Mummert, Veronique Perret, and Jim Rubas, "Dynamic Adaptation in an Image Transcoding Proxy for Mobile Web Browsing", IEEE Personal Communications, Dec. 1998, p. 8-17.

Matthias Dick, Jens Brandt, Verena Kahmann, Lars Wolf, "Adaptive Transcoding Proxy Architecture for Video Streaming in Mobile Networks", Image Processing, 2005, p. 1-4.

Anubhav Savant, Nasir Memon, Torsten Suel, "On the Scalability of an Image Transcoding Proxy Server", p. 1-4.

Dongyu Liu, Songqing Chen, "Modeling and Optimization of Meta-Caching Assisted Transcoding", IEEE Transactions on Multimedia, vol. 10, No. 8, Dec. 2008, p. 1444-1454.

Yoohyun Park, Yongju Lee, Hagyoung Kim, and Kyongsok Kim, "Efficient Segment Based Streaming Media Transcoding Proxy for Various Types of Mobile Devices", PCM, 2007, p. 569-578.

International Search Report, PCT/US2012/051233, Mar. 7, 2012.

\* cited by examiner

METHOD AND TRANSCODING PROXY FOR TRANSCODING A MEDIA STREAM THAT IS DELIVERED TO AN END-USER DEVICE OVER A COMMUNICATIONS NETWORK

BACKGROUND

Media streams, such as video streams, are often times transcoded before being delivered to an end-user device, such as a desktop computer, a laptop computer, a pad computer, or a smart phone. Specifically, the bit rate of the video files may be adjusted. Additionally, the format of the video files may be converted. For example, before the video files are delivered to a wireless device, the bit rate of the video files can be adjusted and the format of the video files can be converted to account for the physical dimensions and resolution of the display of the wireless device.

SUMMARY

Methods and transcoding proxies for transcoding media streams are described. In one embodiment, a method for transcoding a media stream that is delivered to an end-user device over a communications network involves selecting a transcoding technique for the media stream, transcoding a portion of the media stream using the selected transcoding technique, streaming the transcoded portion of the media stream to the end-user device, while the transcoded portion of the media stream is being streamed to the end-user device, detecting a change in a condition of the communications network, selecting a different transcoding technique in response to the change in the condition of the communications network, transcoding a subsequent portion of the media stream using the different transcoding technique, and streaming the transcoded subsequent portion of the media stream to the end-user device. Other embodiments are also described.

In another embodiment, a method for transcoding a video stream that is delivered to an end-user device over a communications network is described. The method for transcoding a video stream that is delivered to an end-user device over a communications network involves selecting a transcoding technique for the video stream, receiving a portion of the video stream from a content source at a transcoding proxy, transcoding the portion of the video stream using the selected transcoding technique at the transcoding proxy, streaming the transcoded portion of the video stream to the end-user device, while the transcoded portion of the video stream is being streamed to the end-user device, detecting a change in a bandwidth condition of the communications network, selecting a different transcoding technique in response to the change in the bandwidth condition of the communications network, receiving a subsequent portion of the video stream from the content source at the transcoding proxy, transcoding the subsequent portion of the video stream using the different transcoding technique at the transcoding proxy, and streaming the transcoded subsequent portion of the video stream to the end-user device. Other embodiments of a method are also described.

Embodiments of a transcoding proxy for transcoding a media stream that is delivered to an end-user device over a communications network are also described. In one embodiment, a transcoding proxy for transcoding a media stream that is delivered to an end-user device over a communications network includes a transcoding server configured to select a transcoding technique for the media stream, to transcode a portion of the media stream using the selected transcoding technique, and to stream the transcoded portion of the media stream to the end-user device, and a transcoding router configured to detect a change in a condition of the communications network while the transcoded portion of the media stream is being streamed to the end-user device. The transcoding server is further configured to select a different transcoding technique in response to the change in the condition of the communications network, to transcode a subsequent portion of the media stream using the different transcoding technique, and to stream the transcoded subsequent portion of the media stream to the end-user device. Other embodiments of a transcoding proxy are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
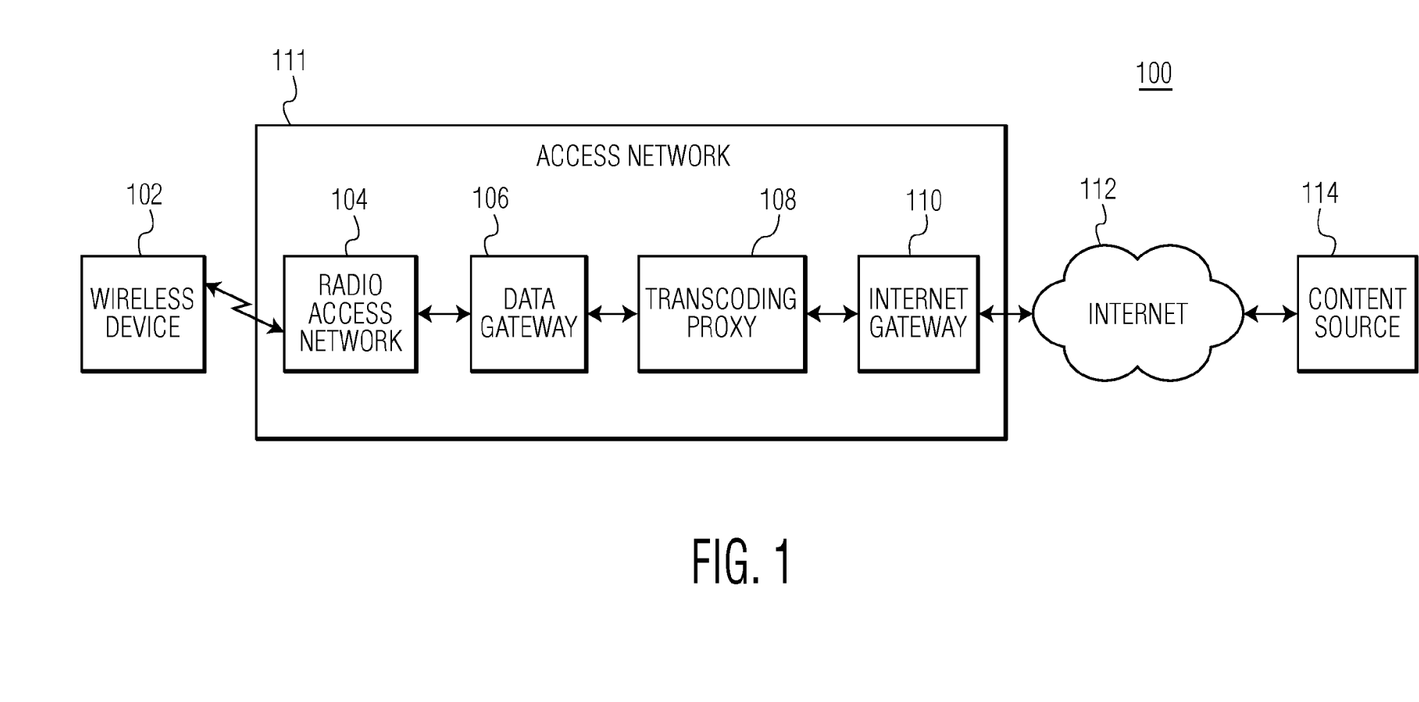
FIG. 1 depicts a schematic block diagram of one embodiment of a content delivery system.

FIG. 1 depicts a schematic block diagram of one embodiment of a content delivery system 100. The content delivery system depicted in FIG. 1 includes a wireless device 102, a radio access network 104, a data gateway 106, a transcoding proxy 108, an Internet gateway 110, the Internet 112, and a content source 114. Although the content delivery system is depicted and described with certain components and functionality, other embodiments of the content delivery system may include fewer or more components to implement less or more functionality. For example, the content delivery system may include more than one wireless device, more than one radio access network, more than one data gateway, more than one transcoding proxy, more than one Internet gateway, and/or more than one content source.

The content delivery system 100 may include any type of end-user device(s) configured to request content from the content source 114 on behalf of at least one end-user and to render received content for presenting to the end-user. The content may be any type of media content. In the embodiment depicted in FIG. 1, the content is a media stream, which is time sensitive media content that is constantly received by and presented to an end-user while being delivered by the content source. The media stream may be a video stream and/or a non-video stream such as an audio stream, or any combination thereof. For example, the media stream may be a live broadcast of an event over the Internet 112. In another example, the media stream is an Internet radio broadcast. In yet another example, the media stream is an on-demand music stream. In an embodiment, the media stream corresponds to a single hyperlink. The end-user may be a single person, multiple persons, other entity or entities. In the embodiment depicted in FIG. 1, the content delivery system includes an end-user device that is implemented as the wireless device 102. Although the content delivery system is shown in FIG. 1 as include one wireless device, in other embodiments, the content delivery system includes multiple wireless devices.

The wireless device 102 of the content delivery system 100 is typically a handheld wireless device, such as a cell phone, a mobile phone, a smartphone, a pad computer, a Personal Digital Assistant (PDA), a handheld gaming device etc, which can wirelessly communicate using radio frequency (RF) communications signals. The wireless device can support various different RF communications protocols, including without limitation, Global System for Mobile communications (GSM), Universal Mobile Telecommunications System (UMTS), Code Division Multiple Access (CDMA), Worldwide Interoperability for Microwave Access (WiMax) and communications protocols as defined by the $3^{rd}$ Generation Partnership Project (3GPP) or the $3^{rd}$ Generation Partnership Project 2 (3GPP2), 4G Long Term Evolution (LTE) and IEEE 802.16 standards bodies. Although some wireless communications protocols are identified herein, it should be understood that the present disclosure is not limited to the cited wireless communications protocols.

The radio access network 104 of the content delivery system 100 is configured to facilitate radio communications between the wireless device 102 and a core network that includes the data gateway 106, the transcoding proxy 108, the Internet gateway 110, the Internet 112, and the content source 114. In an embodiment, the radio access network includes one or more base stations to facilitate communications among wireless devices that are within a communications range of the base stations. Each base station has at least one RF transceiver and the base stations communicate with the wireless devices using RF communications signals. The radio access network facilitates network communications among multiple wireless devices within the same radio access network and between wireless devices in other radio access networks and provides interfaces to facilitate communications with other entities, such as a Public Switched Telephone Network (PSTN), a Wide Area Network (WAN), the Internet, Internet servers, hosts, etc., which are outside of the radio access network. In an embodiment, the network elements depicted in FIG. 1 are part of a wireless network that is operated by a single wireless service provider.

Data signals communicated between the wireless device 102 and the radio access network 104 include, but are not limited to, analog and/or digital RF signals (i.e., radio waves) for any type of communications mode, including text messaging, multimedia messaging, voice calling, and Internet browsing. The radio access network can support various different RF communications protocols, including without limitation, GSM, UMTS, CDMA, WiMax and communications protocols as defined by 3GPP, 3GPP2, or IEEE 802.16. Although some wireless communications protocols are identified herein, it should be understood that present disclosure is not limited to the cited wireless communications protocols.

Although the content delivery system 100 depicted in FIG. 1 includes the wireless device 102 and the radio access network 104, in other embodiments, the content delivery system includes at least one wired device instead of the wireless device and at least one wired communications network instead of the radio access network. The wired device may be a wired communications device that is configured to request content from the content source 114 on behalf of an end-user and to render received content for presenting to the end-user. The wired communications network may be a wired access network such as a dial-up, digital subscriber line (DSL), or cable modem based Internet service provider (ISP) network or a private enterprise network. The wired communications network facilitates communications between the wired communications device and the core network that includes the data gateway 106, the transcoding proxy 108, the Internet gateway 110, the Internet 112, and the content source 114. The wired device may be, for example, a computer equipped with an Ethernet card and the wired communications network may be an Ethernet local area network (LAN). In some embodiments, the content delivery system includes a combination of at least one wireless device, at least one radio access network, at least one wired device, and at least one wired communications network.

The data gateway 106 of the content delivery system 100 configures outgoing data access requests for use with one or more networks and configures incoming data for use by or display on the wireless device 102. As shown, the data gateway interfaces directly with the radio access network 104 and the transcoding proxy 108, although other embodiments may include other intermediate functional elements. In one embodiment, the data gateway uses GPRS Tunneling Protocol (GTP) to communicate with the radio access network. Other embodiments may use other communications protocols. Other conventional operations of the data gateway are known. For example, the data gateway enables users of wireless devices to roam between cells, for example, to move between different locations within the radio access network, by tracking the wireless device's identity across the network. The data gateway may also provide authentication and data formatting functions.

The transcoding proxy 108 of the content delivery system 100 is configured to transcode a media stream that is delivered to the wireless device 102 over a communications network. In an embodiment, the transcoding proxy is implemented in a HTTP proxy server.

The communications network may refer to any communications connection between components of the content delivery system 100 and/or any component of the content delivery system. In an embodiment, the communications network refers to the communications connection between the wireless device 102 and the radio access network 104. In another embodiment, the communications network refers to the communications connection between the wireless device and the radio access network and the radio access network. In another embodiment, the communications network refers to the communications connection between the wireless device and the radio access network and the communications connection between the radio access network and the data gateway 106. In yet another embodiment, the communications network refers to the communications connection between the wireless device and the radio access network, the radio access network, and the communications connection between the radio access network and the data gateway. In yet another embodiment, the communications network refers to the communications connection between the wireless device and the radio access network, the communications connection between the radio access network and the data gateway, and the communications connection between the data gateway and the transcoding proxy. In yet another embodiment, the communications network refers to the communications connection between the wireless device and the radio access network, the radio access network, the communications connection between the radio access network and the data gateway, and the communications connection between the data gateway and the transcoding proxy.

In the embodiment depicted in FIG. 1, the transcoding proxy 108 receives at least one media stream from the content source 114. In an embodiment, the transcoding proxy decides that the received media stream needs to be transcoded. Once it has been decided that transcoding is needed, the transcoding proxy selects a transcoding technique to transcode the received media stream and transmits the transcoded media stream to the wireless device 102. In another embodiment, the transcoding proxy decides that the received media stream does not need to be transcoded. In this case, the transcoding proxy transmits the received media stream to the wireless device without transcoding the received stream.

In an embodiment, the transcoding proxy 108 is configured to select a transcoding technique for the media stream, to transcode a portion of the media stream using the selected transcoding technique, to stream the transcoded portion of the media stream to the wireless device, to detect a change in a condition of the communications network while the transcoded portion of the media stream is being streamed to the end-user device, to select a different transcoding technique in response to the change in the condition of the communications network, to transcode a subsequent portion of the media stream using the different transcoding technique, and to stream the transcoded subsequent portion of the media stream to the wireless device.

The condition of the communications network may be any characteristic or a combination of characteristics of the communications network. In an embodiment, the condition of the communications network is the traffic level of the communications network, which may be measured by available bandwidth of the communications network. When the transcoding proxy 108 detects that the communications network becomes more congested, the transcoding proxy selects a transcoding technique that results in a transcoded media stream whose size is smaller than the original transcoded media stream. When the transcoding proxy detects that the communications network becomes less congested, the transcoding proxy selects a transcoding technique that results in a transcoded media stream whose size is larger than the original transcoded media stream. Compared to detecting the RF channel quality between the wireless device 102 and the radio access network 104 at the physical layer, detecting the network congestion level at higher layer(s) in the Open Systems Interconnection (OSI) model does not consume as much processing resources and is not as CPU-intensive. For example, the network congestion level can be easily obtained from a measure of the backlog of data in the network and/or video frame timestamps. In some embodiments, the transcoding proxy may detect a change in a characteristic of a component in the content delivery system 100 and adjust the transcoding technique in response to the detected change. For example, the transcoding proxy can detect a change in the processing capacity of the wireless device 102 by checking real time performance metrics of the wireless device and adjust the transcoding technique in response to the detected change.

Figure 2:
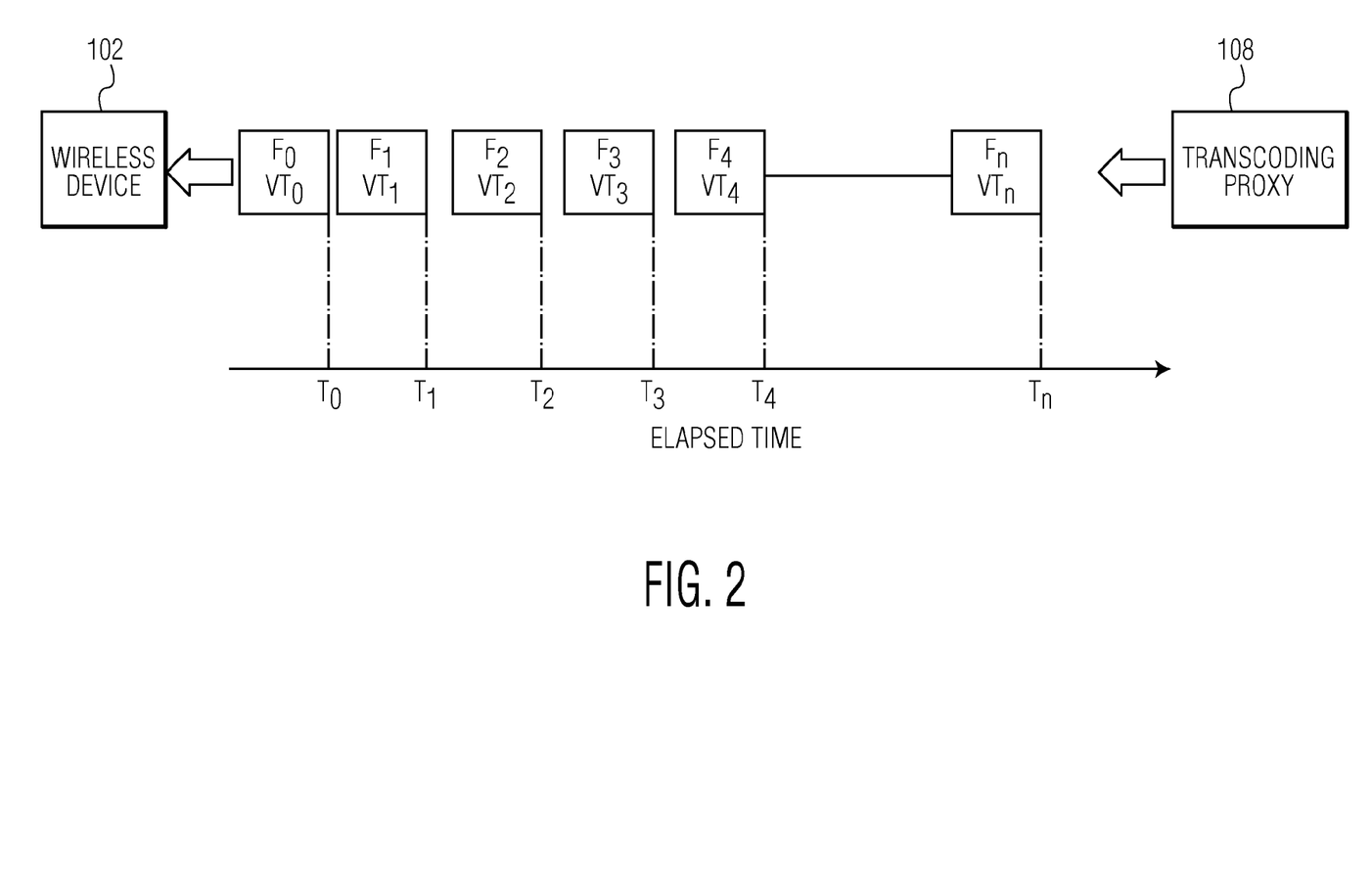
FIG. 2 illustrates an example of using video frame timestamps to measure network congestion level.

FIG. 2 illustrates an example of using video frame timestamps to measure the congestion level of the network. In the embodiment illustrated in FIG. 2, each of the video frames $F_0 \ldots F_n$ has an associated timestamp $VT_0 \ldots VT_n$, where n is an integer that is larger than one. The video frame timestamps are measured from the time when the transcoding proxy 108 begins to transmit video frames to the wireless device. In an embodiment, the video frame timestamps are presentation timestamps (PTS), which are used by the wireless device to determine the right time to display each of the video frames. The elapsed time is the clock time between the time when the transcoding proxy begins to transmit video frames to the wireless device and the time when a video frame is received in full by the wireless device. The wireless device is configured with low and high watermarks, which are measured in seconds. A difference between a video frame timestamp and the corresponding elapsed time can be calculated, for example, by the wireless device or any other component in the content delivery system 100. If the difference between a video frame timestamp and the corresponding elapsed time is at or below the low watermark, the network congestion level is determined to be high and the transcoding proxy selects a transcoding technique that results in a transcoded media stream whose size is smaller than the original transcoded media stream. If the difference between a video frame timestamp and the corresponding elapsed time is at or above the high watermark, the network congestion level is determined to be low and the transcoding proxy selects a transcoding technique that results in a transcoded media stream whose size is larger than the original transcoded media stream.

Two cases of using the difference between a video frame timestamp and the corresponding elapsed time to determine the network congestion level are described as follows. In the two cases, the low watermark is set to 10 seconds and the high watermark is set to 30 seconds. In the first case, video frames are sent in a timely manner. For example, the elapsed time $T_3$ is equal to 30 seconds and the corresponding video frame timestamp $VT_3$ is equal to 50 seconds. The difference between $VT_3$ and $T_3$ is 20 seconds, which is larger than the low watermark and is smaller than the high watermark. The difference between $VT_3$ and $T_3$ indicates that the network is not congested and is able to adequately support the video stream at the current level of compression. In order to take full advantage of the network bandwidth, the video stream can be transcoded at a lower level of compression. In the second case, video frames are sent in an untimely manner. For example, the elapsed time $T_4$ is equal to 40 seconds and the video frame timestamp $VT_4$ is equal to 43 seconds. The difference between $VT_4$ and $T_4$ is 3 seconds, which is below the low watermark. The difference between $VT_4$ and $T_4$ indicates that the network is congested and is not able to adequately support the video stream at the current level of compression. In order to ease congestion in the network, the video stream is transcoded at a higher level of compression.

Turning back to FIG. 1, the he transcoding technique that is used by the transcoding proxy 108 to transcode media streams can be any transcoding mechanism(s) or procedure(s). In an embodiment, the transcoding proxy is configured to transcode at least a portion of a media stream by performing bit rate adjustment and/or format conversion of the media stream. For example, the transcoding proxy may change coding parameters or the coding standard of a video stream and/or adjust spatial and temporal resolution of a video stream. The transcoding proxy may encode an encoded video stream into another encoded video stream of a different format or encode a non-encoded video stream into an encoded video stream. The data size, such as the total bits, of a portion of the transcoded video stream can be smaller than, the same as, or larger than the data size of the corresponding portion of the original video stream. In another example, the transcoding proxy may encode a video stream into an encoded video stream that is more secure. The transcoding proxy can perform bit rate adjustment and/or format conversion of a video stream according to characteristics of the communications channel between the wireless device and the content source. The characteristics of the communications channel between the wireless device and the content source may include the perceived bandwidth of the communications channel between the content source and the wireless device. For example, the transcoding proxy can perform bit rate adjustment and/or format conversion to reduce the resolution and the size of a video stream if the perceived bandwidth of the communications channel between the content source and the wireless device fluctuates due to congestion. In another example, the transcoding proxy can perform bit rate adjustment and/or format conversion to increase the resolution and the size of the video stream if the perceived bandwidth of the communications channel between the content source and the wireless device increases. In addition, the transcoding proxy can perform bit rate adjustment and/or format conversion of a video stream according to characteristics of the wireless device. The characteristics of the wireless device may include hardware characteristics, such as the physical dimensions and the resolution of the wireless device display, processor and memory specifications, and software characteristics, such as supported codecs and delivery protocols of the wireless device. Although the transcoding proxy is described above with respect to video streams, the transcoding proxy can also be used for the transcoding of other types of media streams. For example, the transcoding proxy can be used to transcode non-video media streams, such as audio streams, or any combination of video and non-video streams.

Adapting the transcoding technique of the transcoding proxy 108 to the network condition of the communications network over which a media stream is delivered to an end-user can provide the end-user with an optimal experience in the face of adverse network condition. Specifically, when insufficient network bandwidth is detected, a video stream can be compressed more by reducing the quality of the video stream. Thus, under an insufficient network bandwidth, rather than suffering from stuttering video playback, an end-user can watch a streaming video with a reduced quality. When more bandwidth becomes available, the video quality can be increased to make use of the available bandwidth and improve the viewing experience of the end-user. For example, the popularity of smart phones and laptops on mobile carrier networks increases the demand for online video streaming. Cellular communications carriers, such as AT&T, Verizon, or T-Mobile, can implement the transcoding proxy to deliver a quality user experience over a limited bandwidth. In addition, performing transcoding of media streams at the transcoding proxy can be more advantageous than performing transcoding of media streams at the content source 114. For example, the content source may not be capable of performing transcoding of media streams. In another example, performing transcoding of media streams at the transcoding proxy allows another party, which may be a cellular communications carrier, such as AT&T, Verizon, or T-Mobile, to apply user-specific and/or device-specific transcoding policies to media streams.

Although the transcoding proxy 108 is shown in FIG. 1 as being located between the data gateway 106 and the Internet gateway 110, the transcoding proxy can be located anywhere within the content delivery system 100. In addition, the transcoding proxy can be located in a single device or distributed amongst multiple devices. In an embodiment, the transcoding proxy is located anywhere in the data path between the wireless device 102 and the content source 114. For example, the transcoding proxy may be located between the wireless device and the radio access network, between the radio access network and the data gateway, between the Internet gateway and the Internet 112, and/or between the Internet and the content source. In another embodiment, the transcoding proxy is integrated within or located within at least one component of the content delivery system. The transcoding proxy may be integrated within the radio access network, the data gateway, the Internet gateway, and/or the content source, or located within the Internet. For example, the transcoding proxy is located in a base station or a data center in the radio access network of a wireless carrier, such as, a cellular communications carrier. In another example, the transcoding proxy is integrated within the Internet gateway of a wireless ISP or a wired ISP. In yet another embodiment, the transcoding proxy is located in the Internet as well as in a private network. For example, some component of the transcoding proxy is located in the Internet while the rest of the transcoding proxy is located in the private network.

The Internet gateway 110 of the content delivery system 100 provides a gateway for communications between the wireless device 102 and Internet-connected hosts and/or servers in the Internet 112, which can also be referred to as the "cloud." The Internet gateway may include a Serving General Packet Radio Service (GPRS) Support Node (SGSN) and a Gateway GPRS Support Node (GGSN). For example, the Internet gateway can be a Wireless Application Protocol (WAP) gateway that converts the WAP protocol used by the radio access network to the HTTP protocol used by the Internet. In an embodiment, the Internet gateway enables wireless devices to access multimedia content, such as Hyper Text Markup Language (HTML), compact HTML (cHTML), and extensible HTML (xHTML), which is stored on Internet-connected hosts and/or servers. In the embodiment depicted in FIG. 1, the radio access network 104, the data gateway 106, the transcoding proxy 108, and the Internet gateway are located in an access network 111. In the embodiment depicted in FIG. 1, the access network provides access to the Internet. Typical access networks include wireless service provider networks (e.g. that offer 3G, 4G and/or WiFi access) and ISPs (e.g., that offer dial-up, DSL, and/or cable modem access). A private enterprise network can also serve as an access network if client devices within the private enterprise network can access the Internet through the private enterprise network. The access network may be administered by a single entity or different entities. For example, the access network may be managed by a single ISP, a single wireless service provider, or a private enterprise.

The content source 114 of the content delivery system 100 is configured to store media content, to process requests for media content from the wireless device 102, and to stream requested media content to the wireless device over at least one streaming protocol. The content source may store video content and/or non-video content such as text files, webpage files, image files, audio files, or any combination thereof. In an embodiment, the media content stored in the content source is encoded. For example, the content source may include a content encoder (not shown) to encode original video content or include a content database (not shown) that stores pre-encoded media content. In an embodiment, the media content stored in the content source is not encoded. The content source may serve media content over a single transport protocol or more than one transport protocol. In an embodiment, the content source serves video content over HTTP such as HTTP-Adaptive Streaming (HTTP-AS) and/or real time streaming protocol (RTSP) or other similar protocols. The content source may be an HTTP server. In an embodiment, the content source is part of a video web site, such as YouTube.com, Google Videos, Metacafe.com, and Hulu.com. Although the content delivery system is shown in FIG. 1 as including a single content source, the content delivery system may include multiple content sources in some embodiments. The multiple content sources may be distributed among different devices in a network.

Figure 3:
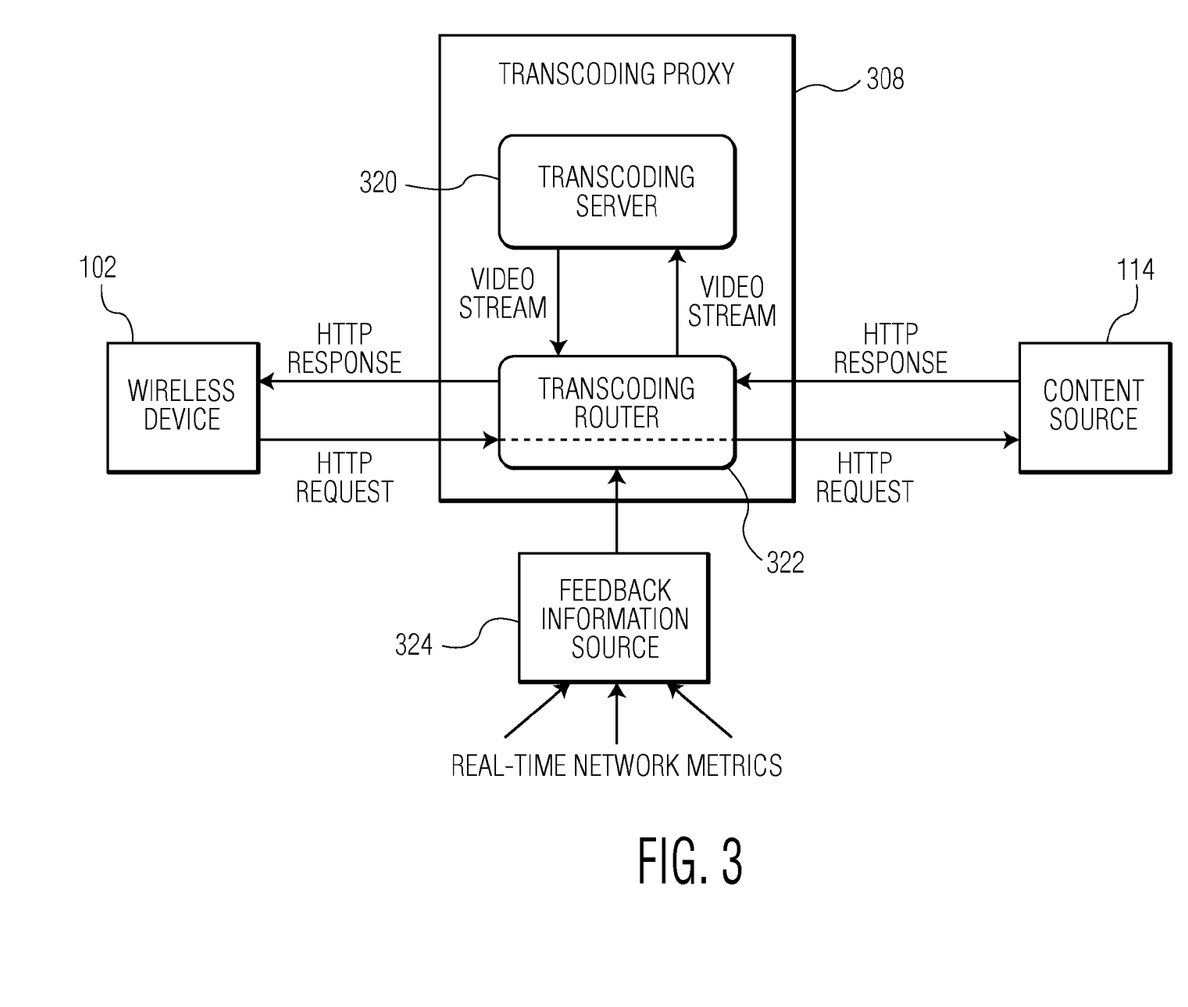
FIG. 3 depicts an embodiment of the transcoding proxy of FIG. 1.

FIG. 3 depicts an embodiment of the transcoding proxy 108 of FIG. 1. In the embodiment depicted in FIG. 3, a transcoding proxy 308 includes a transcoding server 320 and a transcoding router 322. Although the transcoding proxy is depicted and described with certain components and functionality, other embodiments of the transcoding proxy may include fewer or more components to implement less or more functionality. In an embodiment, the transcoding proxy includes multiple transcoding servers. Each of the multiple transcoding servers may be responsible for a specific type of media stream from the content source 114. In an embodiment, components of the transcoding proxy 308 are distributed among different devices in a network. For example, the transcoding server and the transcoding router can be located in separate network devices and/or separate networks.

The transcoding server 320 of the transcoding proxy 308 is configured to select a transcoding technique for a video stream, to receive a portion of the video stream from the content source 114, to transcode the portion of the video stream using the selected transcoding technique, and to stream the transcoded portion of the video stream to the wireless device 102. The transcoding router 322 of the transcoding proxy is configured to detect a change in a condition of the communications network while the transcoded portion of the video stream is being streamed to the wireless device. The transcoding server is further configured to select a different transcoding technique in response to the change in the condition of the communications network, to receive a subsequent portion of the video stream from the content source, to transcode a subsequent portion of the video stream using the different transcoding technique, and to stream the transcoded subsequent portion of the video stream to the wireless device. The video stream can be any type of video stream. In an embodiment, the video stream is in H.263 video compression standard or H.264 video compression standard. The transcoding server and/or the transcoding router may maintain a transcoding policy that defines rules for selecting transcoding techniques. Although the transcoding proxy is described above with respect to video streams, the transcoding proxy can be used for the transcoding of any type of media streams.

In the embodiment depicted in FIG. 3, the transcoding router 322 detects a change in a condition of the communications network by checking information from a feedback information source 324. The feedback information source collects real-time network metrics from the communications network. Compared to detecting the RF channel quality between the wireless device 102 and the radio access network 104 at the physical layer, collecting the feedback information at higher layer(s) in the OSI model does not consume as much processing resources and is not as CPU-intensive. In an embodiment, the feedback information is obtained from a measure of the backlog of data in the network and/or video frame timestamps. For example, the feedback information can be obtained based on the video frame timestamps in FIG. 2.

The change in condition of the communications network may occur at any location within the content delivery system 100. For example, the communications network may refer to any communications connection between components of the content delivery system and/or any component of the content delivery system. For example, the communications network may refer to the communications connection between the wireless device 102 and the radio access network 104, the radio access network, the communications connection between the radio access network and the data gateway 106, and/or the communications connection between the data gateway and the transcoding proxy 108.

Although only one feedback information source 324 is shown in FIG. 3, multiple feedback information sources may exist in the content delivery system 100. In an embodiment, the feedback information source is located anywhere in the data path between the wireless device 102 and the content source 114. For example, the feedback information source may be located between the wireless device and the radio access network 104, between the radio access network and the data gateway 106, between the data gateway and the transcoding proxy 208, between the transcoding proxy and the Internet gateway 110, between the Internet gateway and the Internet 112, and/or between the Internet and the content source. In another embodiment, the feedback information source is integrated within or located within at least one component of the content delivery system. The feedback information source may be integrated within the wireless device, the radio access network, the data gateway, the Internet gateway, and/or the content source, or located within the Internet. For example, the feedback information source is located in a base station or a data center in the radio access network of a wireless carrier. In another example, the feedback information source is integrated within the Internet gateway of a wireless ISP or a wired ISP. In yet another embodiment, the feedback information source is located in the Internet as well as in a private network. For example, some component of the feedback information source is located in the Internet while the rest of the feedback information source is located in the private network.

The transcoding proxy 308 dynamically compresses a video stream in real time to react to changes in the end-user's network bandwidth. In an exemplary operation of the transcoding proxy 308, the wireless device 102 transmits an HTTP request to the content source 114 to request a video stream or a video content element that will be delivered as a video stream. In response to the HTTP request, the content source replies to the wireless device with a single HTTP response message that includes the requested video stream. For example, the content source replies to the wireless device with an HTTP response that includes a first portion of the requested video stream. The transcoding router 322 receives the HTTP response from the content source and transmits the first portion of the original video stream in the HTTP response to the transcoding server 320. In an embodiment, the transcoding router processes the received HTTP response to get the embedded video content and sends only the embedded video content to the transcoding server. In other words, the transcoding router only proxies up the video content from the HTTP Response to the transcoding server. The transcoding server decides whether or not the first portion of the original video stream needs to be transcoded. If the transcoding server decides that the first portion of the original video stream does not need to be transcoded, the transcoding server streams the first portion of the original video stream to the wireless device through the transcoding router. If the transcoding server decides that the first portion of the original video stream needs to be transcoded, the transcoding server selects a transcoding technique to transcode the first portion of the original video stream, transcodes the first portion of the original video stream using the selected transcoding technique, and streams the transcoded first portion of the video stream to an end-user at the wireless device through the transcoding router. In an embodiment, the transcoding router streams the transcoded video content to an end-user over HTTP. For example, the transcoding router encapsulates the transcoded video content into an HTTP response and transmits the HTTP response to the end-user. While the transcoded first portion of the video stream is being streamed to the end-user device, the transcoding router checks real-time network metrics from the feedback information source 324 to detect a change in the condition of the communications network. If a change in the condition of the communications network is detected, the transcoding router signals the transcoding server to report the detected change. The transcoding server reacts to the reported signal from the transcoding router asynchronously and decides whether or not a subsequent portion of the original video stream needs to be transcoded and/or what the new transcoding technique should be. For example, the transcoding server can perform bit rate adjustment and/or format conversion to decrease the resolution and the size of the subsequent portion of the video stream if the detected change indicates that the bandwidth of the communications network fluctuates due to congestion. In another example, the transcoding server can perform bit rate adjustment and/or format conversion to increase the resolution and the size of the subsequent portion of the video stream if the detected change indicates that the communications network becomes less congested.

The transcoding video streams may not be directly streamed from the transcoding proxy 308 to the wireless device 102. In an embodiment, the transcoding proxy receives HTTP responses from an intermediate device (not shown), such as a media optimizer, and transmits transcoded video streams back to the intermediate device. In this embodiment, the intermediate device streams the video streams to the wireless device.

Figure 4:
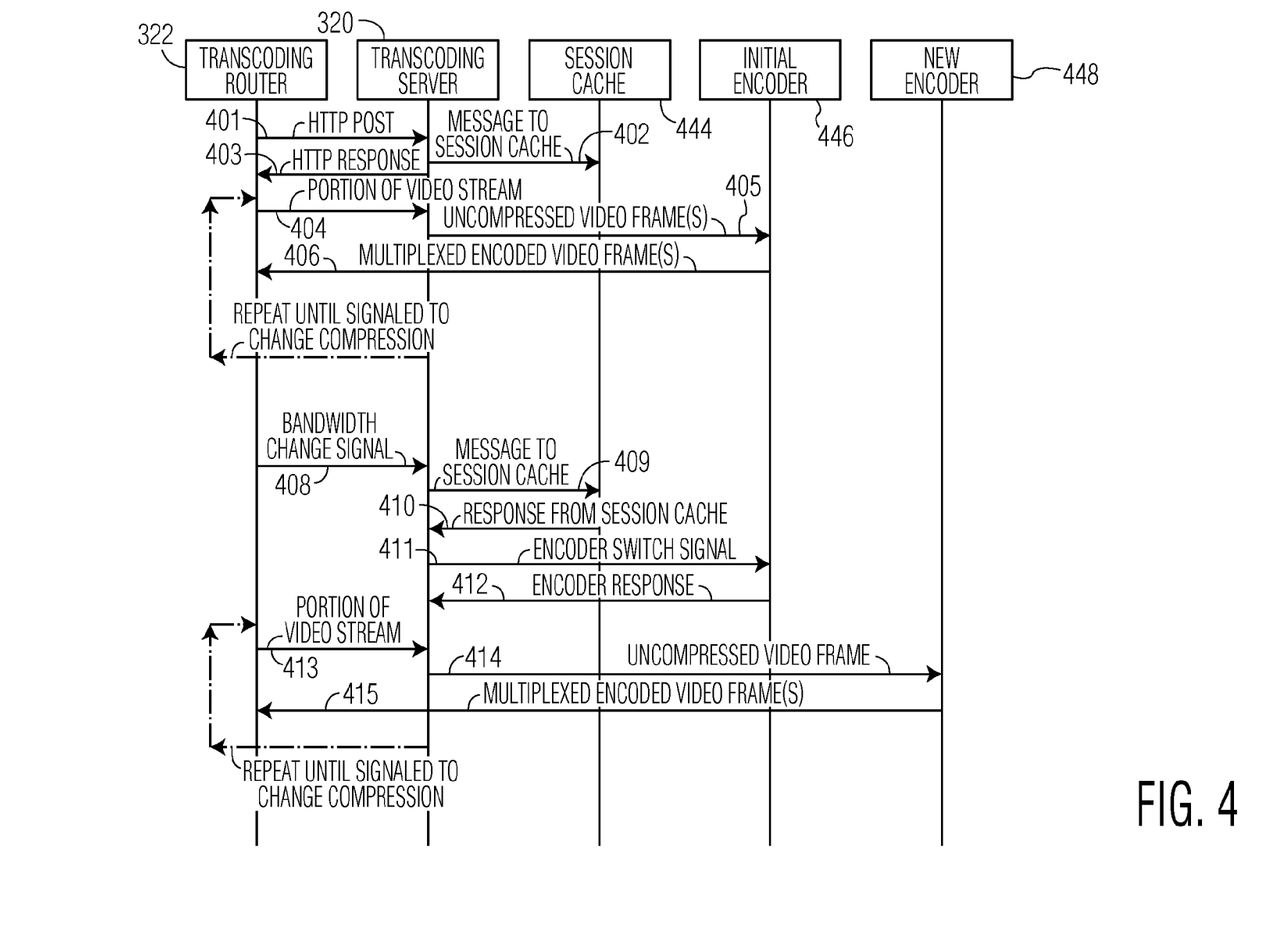
FIG. 4 illustrates an exchange of messages that is used to implement an operation of the transcoding proxy of FIG. 3.

In an embodiment, the transcoding server 320 creates encoder sessions with virtual encoders using encoder threads. FIG. 4 illustrates an exchange of messages that is used to implement an operation of the transcoding proxy 308 of FIG. 3 that creates encoder sessions with virtual encoders. In a first operation, the transcoding router 322 sends an HTTP POST request 401 for a video stream to the transcoding server. The HTTP header(s) of the HTTP POST request inform(s) the transcoding server which predefined compression profile to use. After receiving the transcoding request, the transcoding server establishes an encoder session with an initial virtual encoder 446 and a unique session identifier for the transcoding request of the video stream. In addition, the transcoding server adds the session state information and a reference to the initial virtual encoder in a session cache 444 by sending a message 402 to the session cache. The transcoding server then sends an HTTP response 403 to the transcoding router. The HTTP response includes Meta information about the encoder session established by the transcoding server and the unique session identifier for the transcoding session. This session identifier will be used by the transcoding router to send perceived end-user bandwidth changes to the transcoding server. After receiving the HTTP response, the transcoding router transmits a portion of a video stream 404 to the transcoding server. The transcoding server de-multiplexes and decodes the received portion of the video stream and passes the decoded (uncompressed) video frame(s) 405 to the initial encoder of the established encoder session. The initial encoder re-encodes the decoded video frame(s), multiplexes the re-encoded video frame(s) and sends the multiplexed encoded video frame(s) 406 to the wireless device 102 via the transcoding router. For H.264 video streams, the transcoding server dynamically inserts additional sequence parameter set (SPS) and picture parameter set (PPS) entries into the output advanced video coding (AVC) decoder configuration record in a network abstraction layer (NAL) packet. The communications exchanges 404-406 between the transcoding router, the transcoding server, and the initial encoder are repeated until the transcoding router notifies the transcoding server that the perceived end-user bandwidth is changed.

Communications exchanges 408-415 take place after the transcoding router 322 detects that the perceived end-user bandwidth has changed. In a first operation, the transcoding router sends a bandwidth change signal 408 to notify the transcoding server 320 that the perceived end-user bandwidth is changed. The bandwidth change signal includes a session identifier and information with respect to the new end-user bandwidth. The bandwidth change signal may be an HTTP request message. The transcoding server extracts the session identifier from the bandwidth change signal and sends a message 409, which includes the session identifier, to the session cache 444 to extract the session state. The session cache sends the extracted session state in a response 410 to the transcoding server. The transcoding server asynchronously signals the encoder thread that the encoder 446 must be switched in an encoder switch signal 411. The encoder thread switches the encoder and sends a response 412 to inform the transcoding server the encoder change. In an embodiment, the encoder thread does not switch the encoder until the transcoding of a current key video frame, such as an intraframe (I-frame), is finished or a current key video frame is generated. After the encoder is switched, the transcoding router transmits a subsequent portion 413 of the video stream to the transcoding server. The transcoding server de-multiplexes and decodes the received subsequent portions of the video stream and passes the decoded (uncompressed) video frame(s) 414 to a new encoder 448. The new encoder re-encodes the decoded video frame(s) according to the changed end-user bandwidth, multiplexes the re-encoded video frame(s) and sends the multiplexed encoded video frame(s) 415 to the wireless device through the transcoding router. Communications exchanges 413-415 take place after the transcoding router detects that the perceived end-user bandwidth has changed.

Although the operations herein are shown and described in a particular order, the order of the operations may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Figure 5:
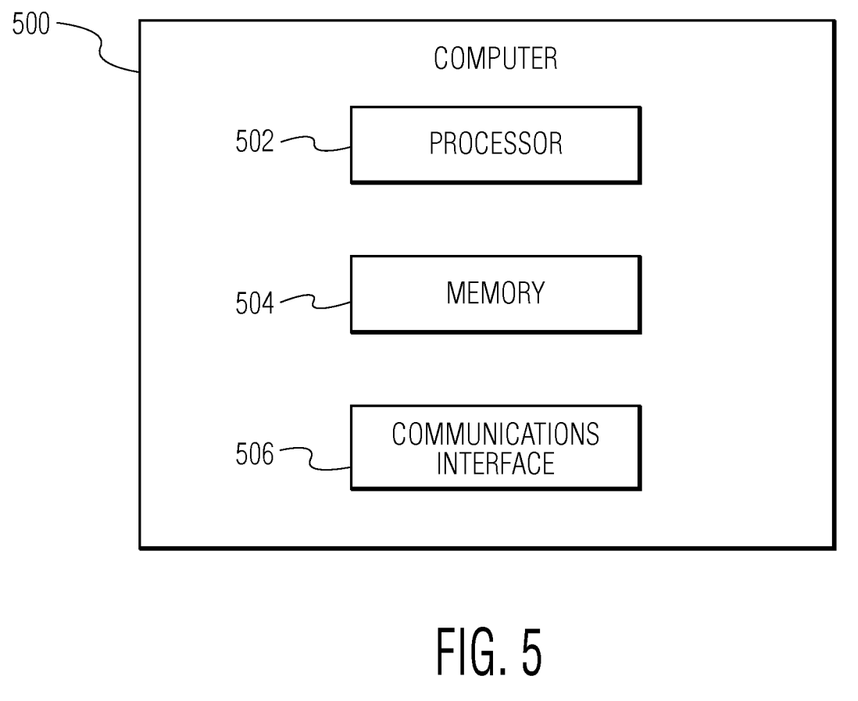
FIG. 5 depicts a computer that includes a processor, memory, and a communications interface.

In an embodiment, at least one of the functionalities of components of the content delivery system 100, such as the transcoding proxy 108 of FIG. 1 and the transcoding proxy 308 of FIG. 3, is performed by a computer that executes computer readable instructions. FIG. 5 depicts a computer 500 that includes a processor 502, memory 504, and a communications interface 506. The processor may include a multifunction processor and/or an application-specific processor. Examples of processors include the PowerPC™ family of processors by IBM and the x86 family of processors by Intel. The memory within the computer may include, for example, storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Figure 6:
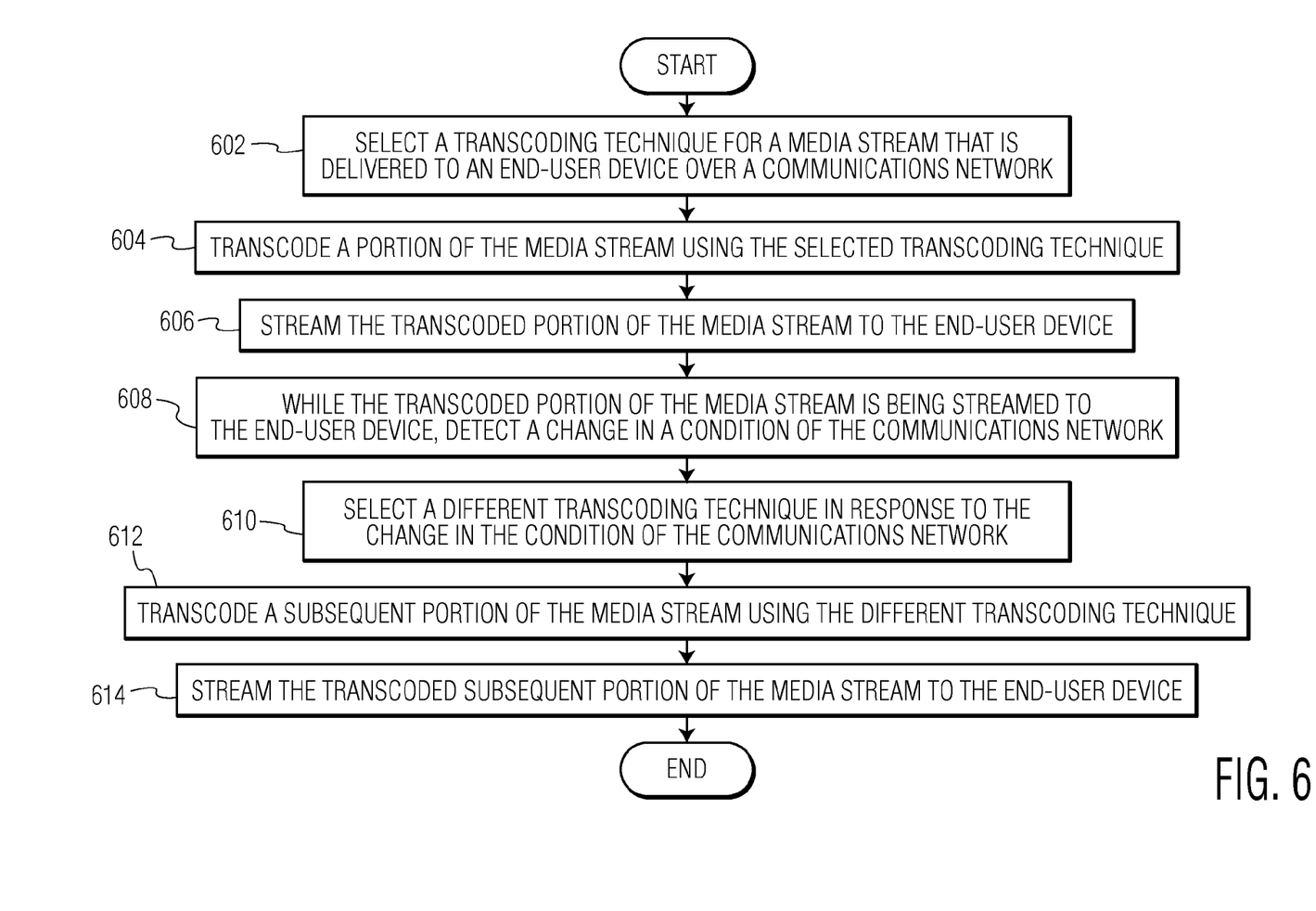
FIG. 6 is a process flow diagram of a method for transcoding a media stream that is delivered to an end-user device over a communications network in accordance with an embodiment of the invention.

FIG. 6 is a process flow diagram of a method for transcoding a media stream that is delivered to an end-user device over a communications network in accordance with an embodiment of the invention. At block 602, a transcoding technique for the media stream is selected. At block 604, a portion of the media stream is transcoded using the selected transcoding technique. At block 606, the transcoded portion of the media stream is streamed to the end-user device. At block 608, while the transcoded portion of the media stream is being streamed to the end-user device, a change in a condition of the communications network is detected. At block 610, a different transcoding technique is selected in response to the change in the condition of the communications network. At block 612, a subsequent portion of the media stream is transcoded using the different transcoding technique. At block 614, the transcoded subsequent portion of the media stream is streamed to the end-user device.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for transcoding a video stream that is delivered to an end-user device over a communications network, the method comprising:
    selecting a transcoding technique for the video stream;
    transcoding a portion of the video stream using the selected transcoding technique;
    streaming the transcoded portion of the video stream to the end-user device;
    while the transcoded portion of the video stream is being streamed to the end-user device, detecting a change in a condition of the communications network;
    selecting a different transcoding technique in response to the change in the condition of the communications network;
    transcoding a subsequent portion of the video stream using the different transcoding technique; and
    streaming the transcoded subsequent portion of the video stream to the end-user device, wherein detecting the change in the condition of the communications network is based upon a calculation of a difference between a presentation timestamp of a video frame in the video stream and an elapsed time of the video frame, wherein the presentation timestamp indicates a correct time to display the video frame at the end-user device and the elapsed time is the time between when a transcoding proxy begins to transmit video frames of the video stream to the end-user device and when the end-user device fully receives the video frame.

2. The method of claim 1 further comprising:
    receiving the portion of the video stream from a content source at the transcoding proxy; and
    receiving the subsequent portion of the video stream from the content source at the transcoding proxy,
    wherein transcoding the portion of the video stream using the selected transcoding technique comprises transcoding the portion of the video stream using the selected transcoding technique at the transcoding proxy, and wherein transcoding the subsequent portion of the video stream using the different transcoding technique comprises transcoding the subsequent portion of the video stream using the different transcoding technique at the transcoding proxy.

3. The method of claim 1, wherein the condition of the communications network comprises a bandwidth condition of the communications network.

4. The method of claim 3, wherein selecting the different transcoding technique in response to the change in the condition of the communications network comprises selecting the different transcoding technique that results in a transcoded video stream whose size is smaller than the original transcoded video stream if the bandwidth condition of the communications network indicates that the communications network becomes more congested.

5. The method of claim 3, wherein selecting the different transcoding technique in response to the change in the condition of the communications network comprises selecting the different transcoding technique that results in a transcoded video stream whose size is larger than the original transcoded video stream if the bandwidth condition of the communications network indicates that the communications network becomes less congested.

6. The method of claim 1, wherein selecting the transcoding technique for the video stream comprises establishing an encoder session with a unique session identifier for the video stream.

7. The method of claim 6, wherein selecting the transcoding technique for the video stream further comprises selecting a virtual encoder for the encoder session, and wherein transcoding the portion of the video stream using the selected transcoding technique comprises transcoding the portion of the video stream using the virtual encoder.

8. The method of claim 7, wherein selecting the different transcoding technique in response to the change in the condition of the communications network comprises selecting a different virtual encoder for the encoder session, and wherein transcoding the subsequent portion of the video stream using the different transcoding technique comprises transcoding the subsequent portion of the video stream using the different virtual encoder.

9. The method of claim 1 wherein detecting the change in a condition of the network is based upon a comparison of the difference and one or more threshold values.

10. The method of claim 9 wherein, if the difference is less than or at a threshold value, selecting the different transcoding technique so that the subsequent portion of the video stream is transcoded at a higher level of compression than was the portion of the video stream.

11. The method of claim 9 wherein, if the difference is greater than or at a threshold value, selecting the different transcoding technique so that the subsequent portion of the video stream is transcoded at a lower level of compression than was the portion of the video stream.

12. The method of claim 1 further comprising calculating the difference between the presentation timestamp and the elapsed time.

13. A transcoding proxy for transcoding a video stream that is delivered to an end-user device over a communications network, the transcoding proxy comprising:
a non-transitory computer readable medium configured to store executable program instructions, which, when executed by an apparatus, cause the apparatus to implement:

a transcoding server configured to select a transcoding technique for the video stream, to transcode a portion of the video stream using the selected transcoding technique, and to stream the transcoded portion of the video stream to the end-user device;

a transcoding router configured to detect a change in a condition of the communications network while the transcoded portion of the video stream is being streamed to the end-user device, wherein the transcoding server is further configured to select a different transcoding technique in response to the change in the condition of the communications network, to transcode a subsequent portion of the video stream using the different transcoding technique, and to stream the transcoded subsequent portion of the video stream to the end-user device, wherein the change in the condition of the communications network is detected based upon a calculation of a difference between a presentation timestamp of a video frame in the video stream and an elapsed time of the video frame, wherein the presentation timestamp indicates a correct time to display the video frame at the end-user device and the elapsed time is the time between when the transcoding proxy begins to transmit video frames of the video stream to the end-user device and when the end-user device fully receives the video frame.

14. The transcoding proxy of claim 13, wherein the condition of the communications network comprises a bandwidth condition of the communications network.

15. The transcoding proxy of claim 14, wherein the transcoding server is further configured to select the different transcoding technique that results in a transcoded video stream whose size is smaller than the original transcoded video stream if the bandwidth condition of the communications network indicates that the communications network becomes more congested.

16. The transcoding proxy of claim 14, wherein the transcoding server is further configured to select the different transcoding technique that results in a transcoded video stream whose size is larger than the original transcoded video stream if the bandwidth condition of the communications network indicates that the communications network becomes less congested.

17. The transcoding proxy of claim 13, wherein the change in the condition of the communications network is communicated from the communications network as feedback information.

18. The transcoding proxy of claim 13, wherein the transcoding server is further configured to establish an encoder session with a unique session identifier for the video stream, to select a virtual encoder for the encoder session, and to transcode the portion of the video stream using the virtual encoder.

19. The transcoding proxy of claim 18, wherein the transcoding server is further configured to select a different virtual encoder for the encoder session and to transcode the subsequent portion of the video stream using the different virtual encoder.

20. The transcoding proxy of claim 13 wherein detecting the change in a condition of the network is based upon a comparison of the difference and one or more threshold values.

21. The transcoding proxy of claim 20 wherein, if the difference is less than a threshold value, the transcoding server is further configured to select the different transcoding technique so that the subsequent portion of the video stream is transcoded at a higher level of compression than was the portion of the video stream.

22. The transcoding proxy of claim 20 wherein, if the difference is greater than a threshold value, the transcoding server is further configured to select the different transcoding technique so that the subsequent portion of the video stream is transcoded at a lower level of compression than was the portion of the video stream.

23. A non-transitory computer readable medium configured to store executable program instructions, which, when executed by an apparatus, cause the apparatus to perform the steps of:

selecting a transcoding technique for a video stream;

transcoding a portion of the video stream using the selected transcoding technique;

streaming the transcoded portion of the video stream to an end-user device;

while the transcoded portion of the video stream is being streamed to the end-user device, detecting a change in a condition of the communications network;

selecting a different transcoding technique in response to the change in the condition of the communications network;

transcoding a subsequent portion of the video stream using the different transcoding technique; and streaming the transcoded subsequent portion of the video stream to the end-user device, wherein detecting the change in the condition of the communications network is based upon a calculation of a difference between a presentation timestamp of a video frame in the video stream and an elapsed time of the video frame, wherein the presentation timestamp indicates a correct time to display the video frame at the end-user device and the elapsed time is the time between when the apparatus begins to transmit video frames of the video stream to the end-user device and when the end-user device fully receives the video frame.

* * * * *